Dec. 28, 1937. L. T. HARRIS 2,103,972
HEAVY DUTY ABRASION RESISTING CHAIN
Filed Oct. 12, 1936
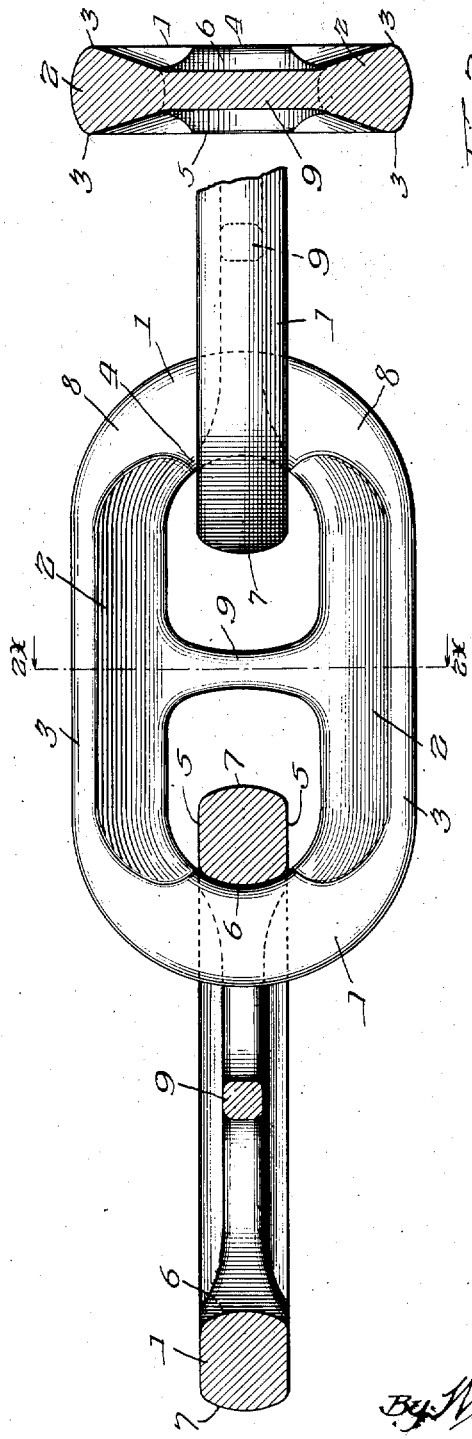
Inventor:
Leonard T. Harris
By Wilkinson Huxley Byron & Knight
Attys.

Patented Dec. 28, 1937

2,103,972

UNITED STATES PATENT OFFICE 2,103,972

HEAVY DUTY ABRASION RESISTING CHAIN

Leonard T. Harris, Chicago Heights, Ill., assignor, by mesne assignments, to The American Brake Shoe & Foundry Co., New York, N. Y., a corporation of Delaware Application October 12, 1936, Serial No. 105,226

4 Claims. (Cl. 59—84)

Links of heavy duty chains—for instance, chains used for pulling dragline buckets and therefore restricted as to weight and requiring long endurance under abrasive influences—so long as they retain a design and sectional dimensions assuring desired tensile strength in their side bars and rigidity against deformation of their arcuate ends, lend themselves to special distribution of their metal masses, bestowing upon them longer duration of service and superior functioning in use, especially when the chain is of the so-called "coil" type.

It is an object of the present invention to provide a link design available for chains in general and appropriate to the type of chain referred to in particular.

Another object of the invention is to provide a sectional design of chain link which, while affording, with a given mass of metal, high tensile strength and rigidity of form, will enlarge those surfaces which encounter the greater proportion of the abrasive influences incident to dragging over the ground or from the shifting impingement of one link upon another.

Still another object is to provide chain links having a distribution of metal mass which not only prolongs the duration of service of the links but leaves them freer to move one upon another and permits them to assume more desirable relative positions when the chain is slack and to more readily resume alignment and therefore lessen liability of entanglement or jamming, when the chain is put under tension.

The invention proceeds upon the principle of locating the larger portion of the metal mass on the outside of the median longitudinal axes of the side bars of the links, substantially throughout the length of said side bars, so that materially less than one-half of said metal mass is to be found within said median longitudinal sidebar axes; such distribution, however, terminating short of the interior and exterior end surfaces through which adjacent links interengage and bear one against the other in transmitting their load; such distribution of metal in the two side bars of a link providing a materially reduced thickness of the inner portions of said side bars; and this decreased thickness preferably prevailing through the spacing strut (when the link has one) and leaving the opposite faces of the link concave and their concavities defined by the side ridges which the thickened portions of the side provide along their outer margins. The resultant sections of the side-bars are thus trapezoidal in form; their major sides are perimetrically positioned; and the opposite faces of the link-ends and ridges of the sides provide perimetrically continuous wearing surfaces in two parallel planes.

In the accompanying drawing—

Figure 1 shows a portion of a chain constructed in accordance with the invention and including an intermediate link in face view, a portion of an interengaged link in edge elevation, and a third link in longitudinal axial section; and Figure 2 is a transverse section in a plane indicated by the line 2x—2x of Figure 1, and including the strut of the link.

1, 1 represent the arcuate ends of a heavy duty link and 2, 2, the side bars thereof formed integrally with said ends. Each side bar is designed with an approximate trapezoidal transverse section, with its portion of major thickness located on the outer side of the median longitudinal axis of the side bar, and its portion of minor thickness located on the inner side of said axis, with the result that each link presents, on each of its broad faces, a concavity extending across the link from one thicker portion to the other, while these thicker portions constitute raised confines of said cavities at the outer margins of the link. These cavities, however, terminate short of the end portions 4 which constitute the bearings through which each arcuate end receives the adjacent link, thus leaving the arcuate ends unimpaired as to area of bearing surface and rigidity against distortion or collapsing of the link when the chain is under tension.

As further contributing to rigidity of the link ends, each of said ends, as indicated by the longitudinal section at the left-hand end of Figure 1, is quadrilateral, being defined by two parallel sides 5 in the same planes with the cavity-defining ridges 3, and inner and outer transverse surfaces 6, 7, curved preferably symmetrically to each other; at least the inner surface 6 of each link end being transversely curved on a radius equal to that which determines the arcing of each link end in the plane of the link; and the surfaces through which the link ends interengage and enter into bearing one upon another, when the chain is under tension, being thus measured in two directions by the rounded transverse face of a link end. A further feature of the preferred design of the links resides in extensions 8 of the link ends tapering into merger with the cavity-defining ridges 3.

9 represents a strut introduced between the inner reduced portions of the sides 2 and corresponding substantially in thickness with said inner sides, so that in addition to serving the conventional function of link struts, these members 9 enter into novel relation with the face cavities of the links in that they form transverse bottom members of said cavities.

From the foregoing, it will be seen that the present invention contemplates a heavy duty chain made of links, each of which is provided with outer marginal elevations or side bar ridges which lend maximum thickness to the sides of the link, and concavities defined by said ridges extending across the faces of the link; which said ridges extend longitudinally in the two facial planes of the link to the end sectors thereof where they spread the maximum thickness throughout the full axial dimension of said end sectors and develop full transverse bearing areas on those portions through which the links interengage and transmit load when the chain is under tension.

I claim:

1. In a chain, interengaging links each comprising side bars and closed ends; the side bars being of trapezoidal section with their minor thickness presented inwardly and their greater thickness presented outwardly and thereby developing opposite concave faces upon the links defined by outer marginal ridges; the interengaging ends of the links having their inner portions corresponding in thickness substantially to that of the sides at said ridges and thereby providing full bearing contact between the interengaging surfaces of the link; each face of the link having its side ridges in the same plane with its end faces, and the end faces and side ridges collectively providing in two parallel planes perimetrically continuous ground contacting surfaces that define the link concavities.

2. Interengaging chain links as described in claim 1, in which the inner bearing faces through which the ends of adjacent links interengage are curved on substantially the same radii in both planes of the link ends so that the load-transmitting faces are measured by dimensions corresponding substantially to the greater thickness of the links.

3. Interengaging chain links as described in claim 1, which also include struts between the sides of the links, said struts corresponding in thickness substantially to the minor thickness of the side bars and providing bottom members for the cavities of the links.

4. A heavy duty chain as described in claim 1 in which the ridge-forming raised portions continue to the end sectors of the links and there spreading to the inner marginal portion of said end sectors, thereby lending maximum thickness to the inner portions of said sectors and providing full transverse bearing areas through which the links interengage and transmit their load when the chain is under tension.

LEONARD T. HARRIS.

CERTIFICATE OF CORRECTION.

Patent No. 2,103,972.    December 28, 1937.

LEONARD T. HARRIS.

It is hereby certified that error appears in the printed specification of the above numbered patent requiring correction as follows: Page 2, second column, line 25, claim 4, for the word "spreading" read spread; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

ner sides, so that in addition to serving the conventional function of link struts, these members 9 enter into novel relation with the face cavities of the links in that they form transverse bottom members of said cavities.

From the foregoing, it will be seen that the present invention contemplates a heavy duty chain made of links, each of which is provided with outer marginal elevations or side bar ridges which lend maximum thickness to the sides of the link, and concavities defined by said ridges extending across the faces of the link; which said ridges extend longitudinally in the two facial planes of the link to the end sectors thereof where they spread the maximum thickness throughout the full axial dimension of said end sectors and develop full transverse bearing areas on those portions through which the links interengage and transmit load when the chain is under tension.

I claim:

1. In a chain, interengaging links each comprising side bars and closed ends; the side bars being of trapezoidal section with their minor thickness presented inwardly and their greater thickness presented outwardly and thereby developing opposite concave faces upon the links defined by outer marginal ridges; the interengaging ends of the links having their inner portions corresponding in thickness substantially to that of the sides at said ridges and thereby providing full bearing contact between the interengaging surfaces of the link; each face of the link having its side ridges in the same plane with its end faces, and the end faces and side ridges collectively providing in two parallel planes perimetrically continuous ground contacting surfaces that define the link concavities.

2. Interengaging chain links as described in claim 1, in which the inner bearing faces through which the ends of adjacent links interengage are curved on substantially the same radii in both planes of the link ends so that the load-transmitting faces are measured by dimensions corresponding substantially to the greater thickness of the links.

3. Interengaging chain links as described in claim 1, which also include struts between the sides of the links, said struts corresponding in thickness substantially to the minor thickness of the side bars and providing bottom members for the cavities of the links.

4. A heavy duty chain as described in claim 1 in which the ridge-forming raised portions continue to the end sectors of the links and there spreading to the inner marginal portion of said end sectors, thereby lending maximum thickness to the inner portions of said sectors and providing full transverse bearing areas through which the links interengage and transmit their load when the chain is under tension.

LEONARD T. HARRIS.

CERTIFICATE OF CORRECTION.

Patent No. 2,103,972. December 28, 1937.

LEONARD T. HARRIS.

It is hereby certified that error appears in the printed specification of the above numbered patent requiring correction as follows: Page 2, second column, line 25, claim 4, for the word "spreading" read spread; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,103,972. December 28, 1937.

LEONARD T. HARRIS.

It is hereby certified that error appears in the printed specification of the above numbered patent requiring correction as follows: Page 2, second column, line 25, claim 4, for the word "spreading" read spread; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents